(12) United States Patent \
Schamer et al.

(10) Patent No.: US 12,205,162 B2 \
(45) Date of Patent: Jan. 21, 2025

(54) SYSTEM AND METHOD FOR PROVIDING TIME TO CURE NEGATIVE BALANCES IN FINANCIAL ACCOUNTS WHILE ENCOURAGING RAPID CURING OF THOSE BALANCES TO A POSITIVE NET POSITION

(71) Applicant: Huntington Bancshares Incorporated, Columbus, OH (US)

(72) Inventors: David Schamer, Powell, OH (US); Lee Lemke, Marion, OH (US); Jeff Kastelic, Mars, PA (US); Bryan James Carson, New Albany, OH (US); Mark Richard Rhoades, Columbus, OH (US)

(73) Assignee: HUNTINGTON BANCSHARES INCORPORATED, Columbus, OH (US)

( * ) Notice: Subject to any disclaimer, the term of this patent is extended or adjusted under 35 U.S.C. 154(b) by 549 days.

(21) Appl. No.: 17/129,779

(22) Filed: Dec. 21, 2020

(65) Prior Publication Data

US 2021/0110470 A1   Apr. 15, 2021

Related U.S. Application Data

(63) Continuation-in-part of application No. 16/945,481, filed on Jul. 31, 2020, now Pat. No. 11,080,782,
(Continued)

(51) Int. Cl.
| | |
|---|---|
| *G06Q 40/02* | (2023.01) |
| *G06Q 20/10* | (2012.01) |
| *G06Q 20/26* | (2012.01) |
| *G06Q 20/28* | (2012.01) |
| *G06Q 20/40* | (2012.01) |

(Continued)

(52) U.S. Cl.
CPC ............ *G06Q 40/02* (2013.01); *G06Q 20/10* (2013.01); *G06Q 20/26* (2013.01); *G06Q 20/28* (2013.01); *G06Q 20/403* (2013.01); *G06Q 20/405* (2013.01); *G06Q 40/00* (2013.01); *G06Q 40/03* (2023.01)

(58) Field of Classification Search
CPC ...................................................... G06Q 40/00
USPC ................................................. 705/35, 36 R
See application file for complete search history.

(56) References Cited

U.S. PATENT DOCUMENTS

| | | | | |
|---|---|---|---|---|
| 5,093,787 | A * | 3/1992 | Simmons | ........... G06Q 20/0425 708/106 |
| 7,182,253 | B1 * | 2/2007 | Long | ...................... G06Q 40/02 235/379 |
| 7,693,784 | B2 * | 4/2010 | Rivest | .................... G06Q 40/06 705/40 |

(Continued)

*Primary Examiner* — Kirsten S Apple \
(74) *Attorney, Agent, or Firm* — Porter Wright Morris & Arthur LLP

(57) ABSTRACT

A computer implemented method and system for providing financial services are described. The system and method include determining an account balance for a financial account. If the account balance is negative, notice of the negative balance is sent to the account holder in real time. After a predetermined period of time or grace period, and/or by a predetermined end time or cut-off date or time, it is determined whether the negative balance was cured. If the negative balance was not cured during the grace period, an overdraft fee is assessed to the financial account. If the negative balance was cured during the grace period, any assessed overdraft fee for the negative balance is rebated or reversed.

20 Claims, 4 Drawing Sheets

Related U.S. Application Data which is a continuation of application No. 15/262,524, filed on Sep. 12, 2016, now Pat. No. 10,748,209, which is a continuation of application No. 14/316,402, filed on Jun. 26, 2014, now abandoned, which is a continuation of application No. 13/718,558, filed on Dec. 18, 2012, now Pat. No. 8,781,955, which is a continuation of application No. 13/112,458, filed on May 20, 2011, now Pat. No. 8,364,581.

(60) Provisional application No. 61/346,629, filed on May 20, 2010.

(51) Int. Cl.
*G06Q 40/00* (2023.01)
*G06Q 40/03* (2023.01)

(56) References Cited

U.S. PATENT DOCUMENTS

| | | | | |
|---|---|---|---|---|
| 7,792,717 B1* | 9/2010 | Hankins | ................ | G06Q 30/06 |
| | | | | 705/35 |
| 7,865,435 B1* | 1/2011 | Medina, III | ........... | G06Q 40/02 |
| | | | | 705/40 |
| 7,958,050 B2* | 6/2011 | Finch | ................... | G06Q 20/102 |
| | | | | 705/40 |
| 2006/0293983 A1* | 12/2006 | Rosenblatt | ............. | G06Q 40/00 |
| | | | | 235/380 |
| 2007/0055594 A1* | 3/2007 | Rivest | .................... | G06Q 40/03 |
| | | | | 705/35 |
| 2007/0106558 A1* | 5/2007 | Mitchell | .................. | G07G 5/00 |
| | | | | 705/16 |
| 2009/0024496 A1* | 1/2009 | Balachandran | ........ | G06Q 30/04 |
| | | | | 705/30 |
| 2009/0327123 A1* | 12/2009 | Wolfson | ............... | G06Q 20/108 |
| | | | | 705/39 |
| 2010/0153247 A1* | 6/2010 | DiPaolo | ................. | G06Q 40/00 |
| | | | | 706/50 |
| 2010/0306103 A1* | 12/2010 | Hankins | ................ | G06Q 40/00 |
| | | | | 705/40 |
| 2011/0191241 A1* | 8/2011 | Blain | ..................... | G06Q 20/10 |
| | | | | 705/42 |
| 2012/0078784 A1* | 3/2012 | Anthony | .............. | G06Q 20/108 |
| | | | | 705/42 |

* cited by examiner

SYSTEM AND METHOD FOR PROVIDING TIME TO CURE NEGATIVE BALANCES IN FINANCIAL ACCOUNTS WHILE ENCOURAGING RAPID CURING OF THOSE BALANCES TO A POSITIVE NET POSITION

CROSS-REFERENCE TO RELATED APPLICATIONS

This application is a continuation-in-part of U.S. patent application Ser. No. 16/945,481 filed Jul. 31, 2020, which is a continuation of U.S. patent application Ser. No. 15/262,524 filed September 1216, now U.S. Pat. No. 10,748,209, which is a continuation of U.S. patent application Ser. No. 14/316,402 filed on Jun. 26, 2014, now abandoned, which is a continuation of U.S. patent application Ser. No. 13/718,558 filed on Dec. 18, 2012, now U.S. Pat. No. 8,781,955, which is a continuation of U.S. patent application Ser. No. 13/112,458 filed on May 20, 2011, now U.S. Pat. No. 8,364,581, which claims the priority benefit of U.S. Provisional Patent Application No. 61/346,629 filed on May 20, 2010, the disclosures of which are each expressly incorporated herein in their entireties by reference.

STATEMENT REGARDING FEDERALLY SPONSORED RESEARCH

Not Applicable

PARTIES TO A JOINT RESEARCH AGREEMENT

Not Applicable

REFERENCE TO APPENDIX

Not Applicable

FIELD OF THE INVENTION

The field of the present invention generally relates to financial services and, more particularly, computer implemented methods and systems for covering overdrafts and/or insufficient funds in financial accounts.

BACKGROUND OF THE INVENTION

An overdraft occurs when a withdrawal from a bank or other financial institution account exceeds the available funds in the account. That is, the account has insufficient funds to cover the withdrawal. In the case of withdrawals such as checks or ACH withdrawals, the account provider can return the withdrawal request as unpaid. In the case of preauthorized withdrawals such as ATM withdrawals and debit or check card withdrawals, however, the account provider must pay the withdrawal request when presented, even if the withdrawal causes an overdraft. The account holder must then seek additional funds from the account holder to cover the overdraft and can charge the account holder overdraft fees as a penalty.

Traditionally, the manager of a bank or other financial institution would look at a list of overdrafts each day. If the manager saw that a favored customer had incurred an overdraft, they had the discretion to pay the overdraft for the customer. Banks traditionally did not charge for this ad-hoc coverage but it was fully discretionary. This traditional ad-hoc coverage has practically disappeared.

Account holders today can obtain overdraft protection plans. An overdraft protection plan is a contractual relationship in which the account provider promises to pay overdrafts up to a certain dollar limit. These overdraft lines of credit are typically loans and account holders typically charge a nominal fee per overdraft and also charge interest on the outstanding balance. Some account providers charge a small monthly fee regardless of whether the line of credit is used. Overdraft protection can cover checks, ATM withdrawals, debit or check card withdrawals, electronic transfers, and the like. In the case of non-preauthorized items such as checks or ACH withdrawals, the overdraft protection allows for these withdrawals to be paid as opposed to being returned unpaid or "bouncing". However, not all account holders qualify for such loans.

Another form of protection available today is often referred to as "linked accounts" or "overdraft transfer protection". For example, a checking account can be linked to another account, such as a savings account, credit card account, or line of credit account. Once the link is established, when a withdrawal is presented that would result in an overdraft, funds are automatically transferred from the linked account to the checking account in cover the overdraft. A nominal fee is usually charged for each overdraft transfer, and if the linked account is a credit card or other line of credit, the consumer may be required to pay interest under the terms of that account. However, not all account holders have multiple accounts that can be linked.

A more recent product being offered by some banks and other financial institutions is often referred to as "bounce protection." The bank may choose to cover overdrawn items at their discretion and charge an overdraft fee. As opposed to traditional ad-hoc coverage, this decision to pay or not pay overdrawn items is largely automated and based on objective criteria such as the customer's average balance, the overdraft history of the account, the number of accounts the customer holds with the bank, and the length of time those accounts have been open. However, there is no explicit promise to pay any debit items into overdraft. Rather, this coverage is discretionary on the part of the financial institution. Financial institutions typically charge a one-time fee for each overdraft paid. A financial institution may also charge a recurring daily fee for each day during which the account has a negative balance.

While these overdraft protections may reduce the number of denied requests or "bounced checks" they can still result in large overdraft fees, interest, and the like and a perceived unfairness by customers. Additionally, the financial institution can be required to wait a substantial period of time before payoff of the overdraft is received. This is particularly true for customers that may not be aware of the overdraft until they receive their monthly statement. Accordingly, there is a need for an improved system and method that reduces overdraft fees and/or insufficient funds fees, encourages rapid payoff of overdrafts, and provides perceived "fairness" to customers.

SUMMARY OF THE INVENTION

Disclosed are computer implemented methods and systems which address one or more issues of the above described related art. Disclosed is computer-implemented method for managing financial accounts, the method comprising the steps of: (a) receiving an ACH transaction from a presenter for deducting a monetary amount from a financial account of a customer; (b) during batch processing on a first day, determining by a financial management system, that there is non-sufficient funds in the financial account for the ACH transaction and flagging the ACH transaction for return to the presenter due to non-sufficient funds but suspending return of the ACH transaction to the presenter; (c) automatically transmitting, to at least one electronic device of the customer and by the financial management system, one or more electronic notifications indicating the non-sufficient funds of the financial account for the ACH transaction, the one or more electronic notifications being transmitted during a predetermined period of time; (d) during batch processing on a second day which is after the first day, determining by the financial management system whether the financial account has sufficient funds for the ACH transaction, and either (i) responsive to there being non-sufficient funds in the financial account for the ACH transaction, automatically assessing a fee, to the financial account and by the financial management system, if the fee was not previously assessed to the financial account, or (ii) responsive to there being sufficient funds in the financial account for the ACH transaction, either waiving the fee, or rebating the fee, to the financial account and by the financial management system, if the fee was previously assessed to the financial account; and (e) either (i) responsive to there being non-sufficient funds in the financial account for the ACH transaction at batch processing on the second day, returning the ACH transaction to the presenter or (ii) responsive to there being sufficient funds in the financial account for the ACH transaction at batch processing on the second day, deducting the monetary amount of the ACH transaction from the financial account.

Also disclosed is a f financial accounts management system comprising at least one processor, a network interface in signal communication with at least one electronic device associated with a customer, and memory storing instructions that, when executed by the at least one processor of the financial management system, cause the financial management system to: (a) receive an ACH transaction from a presenter for deducting a monetary amount from a financial account of a customer; (b) during batch processing on a first day, determine by a financial management system, that there is non-sufficient funds in the financial account for the ACH transaction and flag the ACH transaction for return to the presenter due to non-sufficient funds but suspend return of the ACH transaction to the presenter; (c) automatically transmit to the at least one electronic device of the customer and by the financial management system, one or more electronic notifications indicating the non-sufficient funds of the financial account for the ACH transaction, the one or more electronic notifications being transmitted during a predetermined period of time; (d) during batch processing on a second day which is after the first day, determine by the financial management system whether the financial account has sufficient funds for the ACH transaction, and either (i) responsive to there being non-sufficient funds in the financial account for the ACH transaction, automatically assess a fee, to the financial account and by the financial management system, if the fee was not previously assessed to the financial account, or (ii) responsive to there being sufficient funds in the financial account for the ACH transaction, either waive the fee, or rebate the fee, to the financial account and by the financial management system, if the fee was previously assessed to the financial account; and (e) either (i) responsive to there being non-sufficient funds in the financial account for the ACH transaction at batch processing on the second day, return the ACH transaction to the presenter or (ii) responsive to there being sufficient funds in the financial account for the ACH transaction at batch processing on the second day, deduct the monetary amount of the ACH transaction from the financial account.

From the foregoing disclosure and the following more detailed description of various preferred embodiments it will be apparent to those skilled in the art that the present invention provides a significant advance in the technology and art of financial systems and methods. Particularly significant in this regard is the potential the invention affords for providing systems and methods which encourage the rapid payment of overdrafts. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved systems and methods disclosed herein. The following detailed discussion of various alternative and preferred embodiments will illustrate the general principles of the invention. Other embodiments suitable for other applications will be apparent to those skilled in the art given the benefit of this disclosure.

Figure 1:
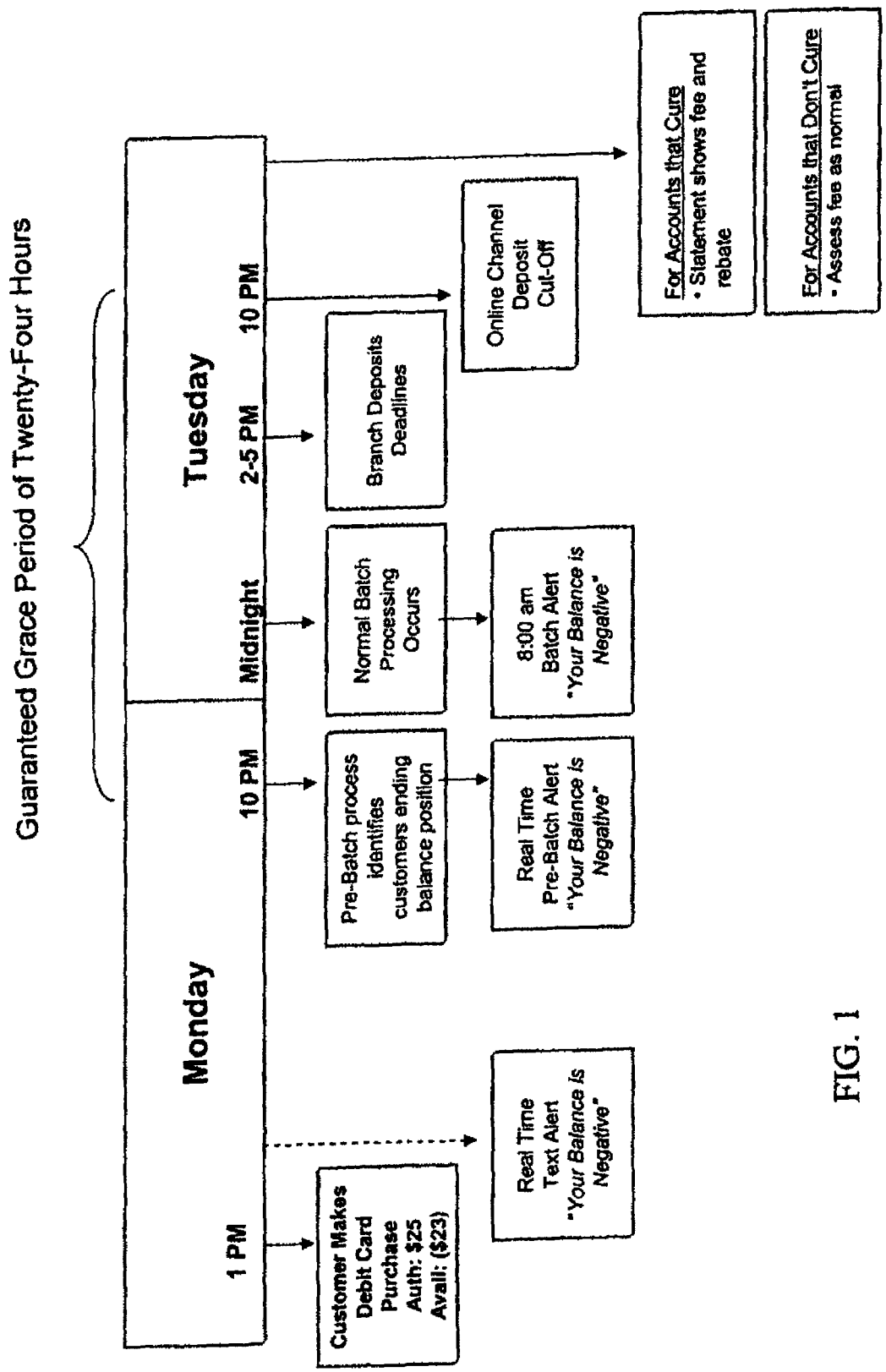
FIG. 1 is a time line showing a method according to a first embodiment of the present invention.

Referring now to the drawings, FIG. 1 illustrates a system and method for encouraging rapid coverage of insufficient funds in financial accounts according to a first embodiment of the present invention. When a customer of a financial institution makes a financial transaction, such as an ATM withdrawal, a debit or check card withdrawal, or the like the financial account of the customer can either have enough funds to cover the transaction or can have less than the required funds to cover the transaction. If the transaction requires more funds than is available in the financial account, the financial account has a negative balance or is in an overdraft condition. In the illustrated embodiment, the customer makes a debit card purchase at 1 PM which is authorized for $25 when the customer's financial account already had a negative balance of $23.

In response to the overdraft, the illustrated financial institution sends an automated electronic transaction alert or notice of the overdraft to the customer. The illustrated electronic transaction alert is sent in real time by automated text message to the customer's mobile phone or the like. The automated electronic transaction alert can additionally or alternatively be sent by automated email to the customer's email address, automated voice message to the customer's phone, or any other suitable means of real time automated electronic communication. The transaction alert notifies the customer that there are insufficient funds in their financial account for the transaction that just occurred, that is, that their account balance is currently negative. The transaction alert can additionally include further information such as, for example, specific identification of the transaction that caused the insufficient funds condition, the amount of the insufficient funds, the deadline for covering the insufficient funds to avoid an overdraft fee or penalty, the overdraft fee or penalty that will be assessed to the financial account if the insufficient funds are not covered by the deadline, and/or any other suitable information.

The following is an exemplary automated electronic transaction alert that can be sent the following the transaction: We're sending this email because your account ending in XXXX was overdrawn today. here's the good news: because you're a XXXX customer you have a grace period which gives you more time to make it right and avoid overdraft fee(s). To take advantage of this grace period just make a timely deposit today or tomorrow and you can avoid overdraft fees from yesterday's overdraft. Your deposit today or tomorrow must be enough so that your account balance at the end of tomorrow is not less than $0. We want to help you avoid the overdraft fee(s) for today's overdraft, so if you have any questions, please don't hesitate to talk to your banker by calling XXX-XXX-XXXX 24 hours a day, 7 days a week, or go online to XXXXXXXX.com.

Typically, an overdraft fee or penalty would be assessed to the customer's account if the overdraft condition was still present at the evening's normal pre-batch processing. Thus, the customer would need to deposit the needed funds to cure the insufficient funds to a branch before the close of business for the day or online before the online-deposit cutoff for the day in order to avoid the overdraft fee or penalty. However, according to the present invention, the customer is given a predetermined period of time or grace period to cover the insufficient funds beyond the evening's normal processing time of the transaction. The predetermined period of time or grace period can be defined by either a length of time from a specific event (for example, length of time such as twelve or twenty-four hours after the time of processing the transaction) and/or by a predetermined end time or cut-off date or time (for example, noon or midnight the next calendar or business day). Preferably, the grace period extends at least into the next day, that is, the next calendar day after the transaction occurs and/or is processed, and more preferably extends at least into the next business day after the transaction occurs and/or is processed. The next business day is the next calendar day that the financial institution has branches open for business to receive deposits from the customer. In the illustrated, embodiment the customer is given a grace period of one day or twenty four hours (from the processing time on the day of the transaction until the processing time on the next calendar day) in order to cover the insufficient funds. This grace period extends into the next calendar day after the transaction but could alternatively be one day unless the next calendar day is not a business day and then the grace period is as many calendar days as necessary to give the customer at least one business day. Thus, the customer can deposit the needed funds to cure the insufficient funds to a branch before the close of business the following calendar day (if open for business) or online before the online-deposit cutoff for the following day in order to avoid the overdraft fee or penalty. It is noted that the grace period can alternatively be any other suitable period of time. For example, the grace period could be shorter such as, for example, until noon the next calendar day, until a specific branch closes, until all branches close (2 to 5 PM) the next business day, until the online deposit cutoff, or the like. Also for example, the grace period could be longer such as, for example, eighteen-hours, thirty-six hours, forty-eight hours, or more or anything therebetween.

In the illustrated embodiment, the financial institution runs a pre-batch process later that evening at 10 PM which identifies the customer's daily ending balance for their financial account. In response to the overdraft which is still present at the pre-batch process, the financial institution sends an automated electronic pre-batch alert or notice of the continued overdraft to the customer (or initial notice of the overdraft if a prior alert has not been sent). The illustrated automated electronic pre-batch alert is sent in real time by automated text message to the customer's mobile phone or the like. The automated electronic pre-batch alert can additionally or alternatively be sent by automated email to the customer's email address, automated voice message to the customer's phone, or any other suitable means of automated real time electronic communication. The automated electronic pre-batch alert notifies the customer that there is insufficient funds in their financial account at their daily ending balance, that is, that their account balance is currently negative. The automated electronic transaction alert can additionally include further information such as, for example, specific identification of the transactions of the day that caused the insufficient funds, the amount of the insufficient funds, the deadline for covering the insufficient funds to avoid an overdraft fee or penalty, the overdraft fee or penalty that will be assessed to the financial account if the insufficient funds are not covered by the deadline, and/or any other suitable information. It is noted that the automated electronic pre-batch alert would not be sent if a deposit was made to cover the insufficient funds prior to the pre-batch processing such that the customer's ending daily balance was not negative. Alternatively, the automated electronic pre-batch alert could still be sent to notify the customer that the insufficient funds have been successfully covered if a prior over daft alert was previously sent.

The following is an exemplary automated electronic pre-batch alert that can be sent at pre-batch processing if a transaction alert was already sent and the account remains overdrawn: We're sending this email because your account ending in XXXX was overdrawn today and remains overdrawn. here's the good news: because you're a XXXX customer you have a grace period which gives you more time to make it right and avoid overdraft fee(s). To take advantage of this grace period just make a timely deposit tomorrow and you can avoid overdraft fees from yesterday's overdraft. Your deposit tomorrow must be enough so that your account balance at the end of tomorrow is not less than $0. We want to help you avoid the overdraft fee(s) for today's overdraft, so if you have any questions, please don't hesitate to talk to your banker by calling XXX-XXX-XXXX 24 hours a day, 7 days a week, or go online to XXXXXXXX.com.

In the illustrated embodiment, the financial institution runs normal batch processing later that evening at Midnight. In response to the overdraft which is still present at the batch processing, the financial institution sends an automated electronic batch alert or notice of the continued overdraft to the customer (or initial notice of the overdraft if a prior alert has not been sent). The illustrated automated electronic batch alert is sent at a predetermined time the next day, such as the next morning at 8:00 AM, by automated text message to the customer's mobile phone or the like. The automated electronic batch alert can additionally or alternatively be sent by automated email to the customer's email address, automated voice message to the customer's phone, or any other suitable means of automated real time electronic communication. The automated electronic batch alert indicates to the customer that there was insufficient funds in their financial account at their daily ending balance, that is, that their account balance is currently negative. The automated electronic batch alert can additionally include further information such as, for example, specific identification of the transactions of the day that caused the insufficient funds, the amount of the insufficient funds, the deadline for covering the insufficient funds to avoid an overdraft fee or penalty, the overdraft fee or penalty that will be assessed to the financial account if the insufficient funds are not covered by the deadline, and/or any other suitable information. It is noted that the automated electronic batch alert would not be sent if for some reason the batch processing indicated that the customer's ending daily balance was not negative. Alternatively, the automated electronic batch alert could still be sent to indicate to the customer that the insufficient funds have been successfully covered if a prior over draft alert was previously sent. It is noted that the automated electronic batch alert can alternatively be sent in real time, this is particularly advantageous if a pre-batch alert is not sent.

The following is an exemplary automated electronic batch alert that can be sent the morning following batch processing: We're sending this email because your account ending in XXXX was overdrawn yesterday. here's the good news: because you're a XXXX customer you have a grace period which gives you more time to make it right and avoid overdraft fee(s). To take advantage of this grace period just make a timely deposit today and you can avoid overdraft fees from yesterday's overdraft. Your deposit today must be enough so that your account balance starting tomorrow morning is not less than $0. We want to help you avoid the overdraft fee(s) for yesterday's overdraft, so if you have any questions, please don't hesitate to talk to your banker by calling XXX-XXX-XXXX 24 hours a day, 7 days a week, or go online to XXXXXXXX.com.

It is noted that if desired, one or more of the automated electronic transaction, pre-batch, and batch alerts can be eliminated within the scope of the present invention or other automated electronic alerts or notices can be added within the scope of the invention. For example, the method could include no automated electronic alerts or only one automated electronic alert such as, for example, an automated electronic alert sent the morning after the overdraft transaction. Preferably, customers have an option to enroll in one or more automated electronic alerts as desired by the customer. It is also noted that additional or alternative automated electronic alerts or notices can be sent to customers if desired at other suitable times within the scope of the present invention.

In the illustrated embodiment, the branch deposit cut-off or deadline for the financial institution is 2 to 5 PM the next day (depending on the specific branch) and the online deposit cut-off or deadline for the financial institution is 10 PM. It is noted that these cutoffs or deadlines can alternatively be any other suitable time depending on the financial institution. If the customer fails to make a deposit or deposits by these deadlines such that daily ending balance for the next calendar day remains negative, the financial institution assess an overdraft fee or penalty to the customer's financial account. However, if the customer makes a deposit or deposits by the deadlines such that daily ending balance for the next calendar day is not negative, the financial institution both assesses an overdraft fee or penalty to the financial account and rebates or reverses the overdraft fee or penalty to the customer's financial account. Alternatively, the financial institution can waive the overdraft fee or penalty and not assess it to the customer's financial account.

It is noted that in a variation of the above-described method, the overdraft fee or penalty is assessed to the account at the end of the transaction day as if there was not a grace period and is rebated or reversed if the insufficient funds are covered within the grace period.

The financial account is preferably provided the predetermined period of time to cure the negative balance and the automated electronic alerts without incurring additional costs. That is, the grace period and its associated alerts are provided to the customer by the financial institution as a free service without charging interest, a service fee, or the like for these services to the client's financial account. While the financial institution may have reduced income from lost overdraft fees and the like, the illustrated method encourages rapid payoff of overdrafts and/or insufficient funds, and provides a sense of fairness to customers.

Figure 2:
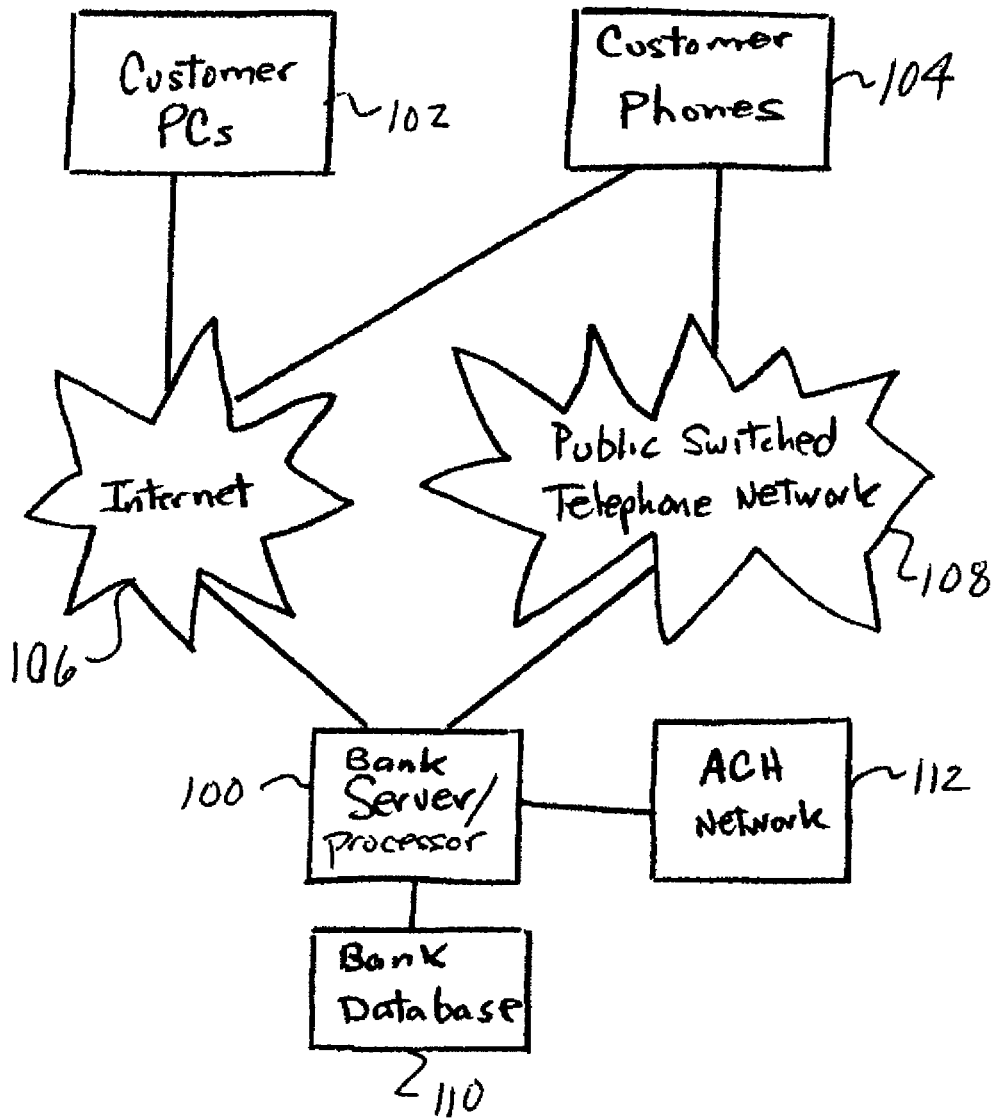
FIG. 2 is a block diagram of a system for carrying out the method of FIG. 1.

FIG. 2 illustrates an exemplary system for carrying-out the above described method which includes a computer system or server 100 of the financial institution which is in communication with customer's wired and unwired computers 102 such a personal computers (PCs), laptop computers, notebook computers, tablet computers, handheld computers, and the like via the Internet 106 or other suitable computer networks and/or the Public Switched Telephone Network (PSTN) 108 or other suitable telephone network. The computer system or server 100 of the financial institution is in communication with customer's wired and unwired telephones 104 and the like via the Internet 106 or other suitable computer networks and/or the Public Switched Telephone Network (PSTN) 108 or other suitable telephone network. The computer system 100 includes or is in communication with a database 110 or the like for storing and retrieving customer information such as, for example, names, phone numbers, email addresses, and the like. The computer system 100 is in communication with the Automated Clearing House (ACH) 112 or the like via a suitable network. The ACH is an electronic network for financial transactions in the United States.

The computer system 100 is programmed with computer software to carry out the above-described method. the computer software is stored on a computer-readable medium and is operable to: determine an account balance for a financial account of a customer and if the account balance is negative, determine after a predetermined period of time whether the negative balance of the financial account was cured. An overdraft fee is assessed to the financial account if the negative balance of the financial account was not cured during the predetermined period of time. The predetermined period of time is at least until the next day which can be the next calendar day or the next business. The predetermined period of time is preferably at least twenty four hours. The computer software is operable to send an automated electronic notice of the negative balance to the customer. The electronic notice(s) is/are sent in real-time at determining the account balance is negative, in real-time at pre-batch ACH processing, real-time at batch ACH processing, and/or the morning of the next day after determining the account balance is negative.

Figure 3:
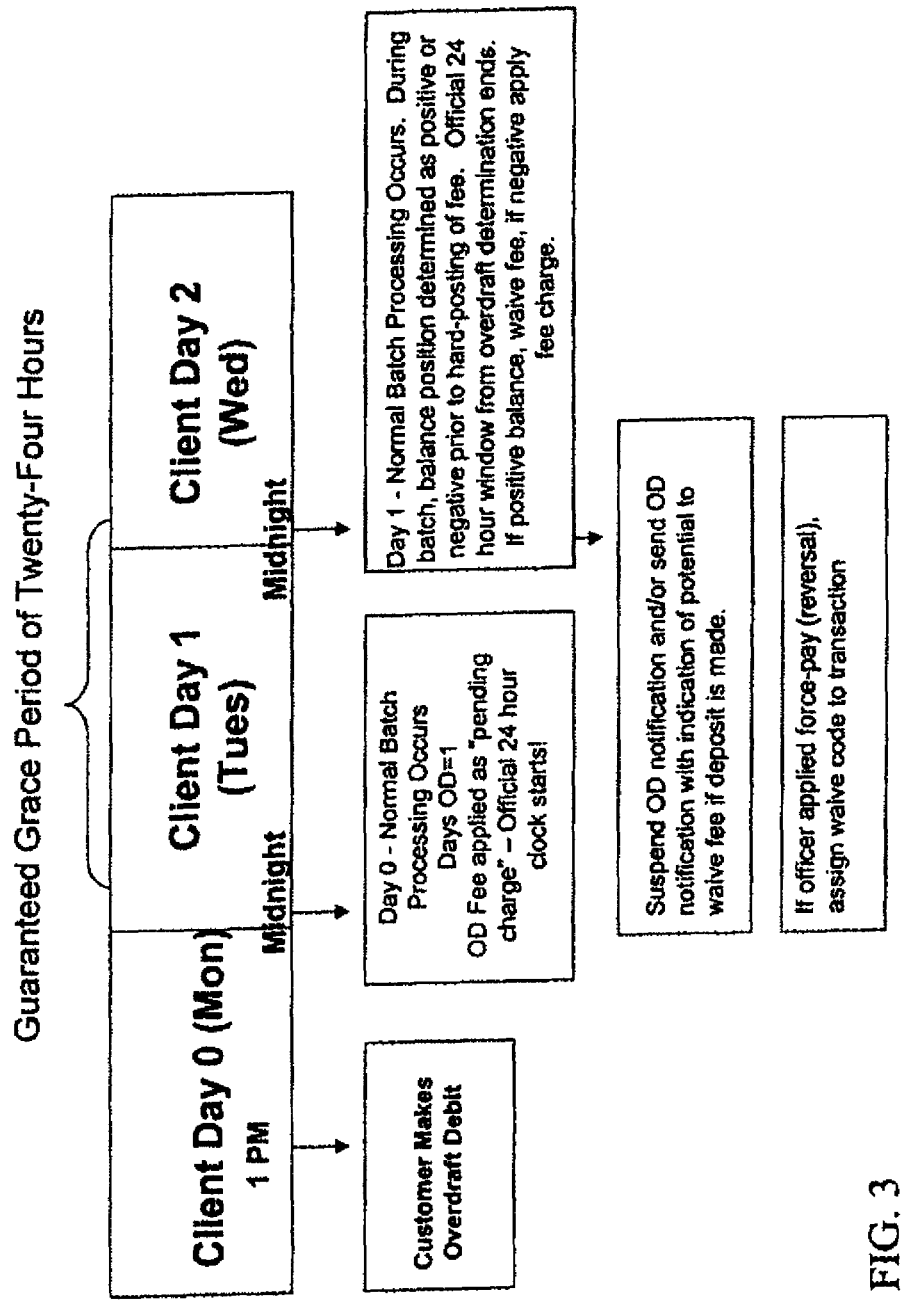
FIG. 3 is a time line showing a method according to a second embodiment of the present invention wherein customers have a twenty-four hour period of time to cure an overdraft balance.
Figure 4:
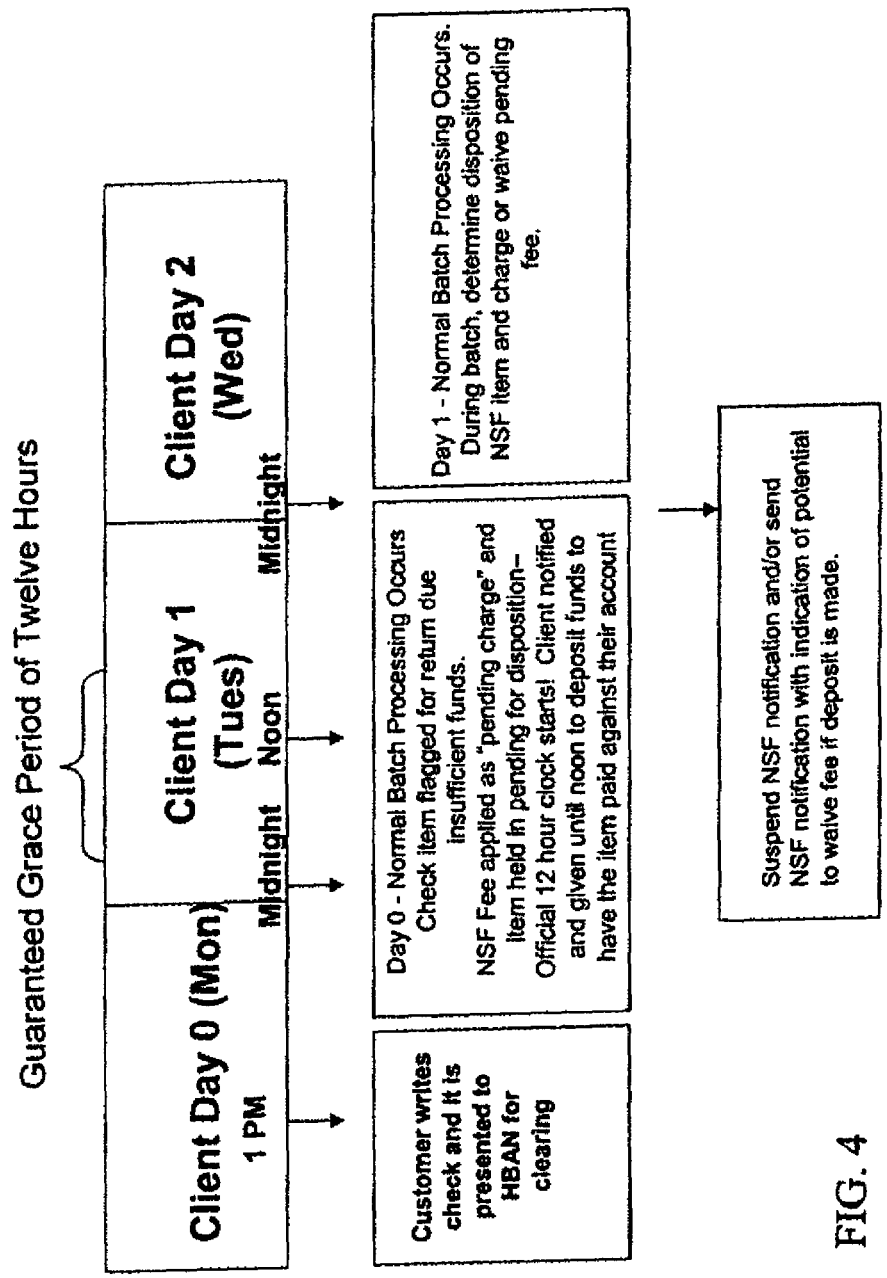
FIG. 4 is another time line showing another aspect of the method FIG. 3 wherein customers also have a twelve hour period of time to fund pending transactions.

FIGS. 3 and 4 illustrate a system and method for encouraging rapid coverage of insufficient funds in financial accounts according to a second embodiment of the present invention. These embodiments are substantially the same as the first embodiment described above but predetermined period of time or grace period before returning checks and ACH debit transactions to the presenter so that the account holder can fund the transaction. That is, if an account holder writes a check or ACH withdrawal and there is insufficient funds in their account for the transaction and the financial institution chooses not to pay the item into overdraft, before returning the check to the presenter, the financial institution notifies the account holder with an automated electronic alert or notice and requests them to fund their account within the predetermined period of time or grace period. If the account holder timely funds their account for the transaction, the item will be paid rather than returned to the presenter and the account holder is not charged a non-sufficient funds (NSF) fee. If the account holder does not timely fund the account for the transaction, the item is returned to the presenter and the account holder is charged an NSF fee. In this illustrated embodiment, the grace period for curing an overdraft is twenty-four hours from processing the transaction and the grace period for funding a pending transaction is twelve hours from the normal processing when the transaction is flagged for return. It is noted that while these two illustrated grace periods are different periods of time, they can alternatively be the same period of time. It is also noted that either of these grace periods can alternatively be any other suitable predetermined periods of time.

With regard to checks or other ACH debit transactions that that have NSF, an incoming check or ACH debit transaction where the financial account has NSF is marked or flagged for return to the presenter but is held for a predetermined period of time such as a business day to see if the NSF is cured by the account holder by timely funding the financial account prior to deadline. If the NSF is cured by the predetermined deadline, a NSF fee is waived and the check or ACH debit transaction is paid rather than being returned to the presenter If the NSF is not cured by the predetermined deadline, the NSF fee is posted to the financial account and the check or ACH debit transaction is returned to the presenter. Alternatively, the NSF fee can be posted to the financial account when the check or ACH debit transaction is marked for return and refunded if the NSF for the check or ACH debit transaction is cured by the predetermined deadline.

Financial institutions typically begin batch processing at or near the end of each business day (Monday through Friday). Processing of ACH debit transactions should preferably be completed before the 12:30 AM Federal return deadline and processing of checks should preferably be completed before the 2:15 AM Federal return deadline At least one automated electronic alert or notice is preferably sent to the account holder informing them of the NSF for their account. The automated electronic alert or notice can also include notice that the customer has the ability to have the NSF items paid and the NSF waived if they make a sufficient deposit to the financial account within the predetermined period of time, the amount that must be deposited to the financial account in order to cover all held checks and ACH debit transactions in addition to any other transactions that day, the deadline for curing the financial account, the amount of the NSF fee, and/or the like. The one or more automated electronic alerts or notices can be immediately sent upon determining that the check or ACH debit transaction is being held during batch processing in real time, shortly after the determination during batch processing, and/or sometime later in the morning. Preferably, at least one automated notice or alert is sent within about 12 hours when the deadline for curing is one about business day.

There can be a daily payment limit (DPL) for check and ACH debit transaction returns that can be held each day for each financial account. For example, the DPL can be, for example but not limited to, about $10,000, about $100,000, or the like. The DPL can be configurable for each account, for example but not limited to, based upon product type, account tenure, customer size, customer demographics, and/or the like in order to reduce risk. If the account has multiple checks or ACH debit transactions the total must be under the DPL or none of the checks or ACH debit transactions are held. It is all or nothing. For example, if a customer account has a DPL of $2,500, the account balance is zero, there are three checks to process for the account where check #1 is for $2,000, check #2 is for $750, and check #3 is for $300 and there are no other transactions, none of the checks will be held because the total of $3,050 is greater than the DPL of $2,500. Alternatively, the checks can stand on their own based on the order of processing. For the above example, check #1 would be held but check #2 and check #3 would each be returned because each of check #2 and check #3 push the total over the DPL after check #1 is processed. Also alternatively, the checks can be processed in order of lowest to highest amounts in order to increase the number of checks that can be held. For the above example, check #2 and check #3 would each be held but check #1 would be returned because check #1 pushes the total over the DPL once check #2 and check #3 are processed.

Any of the features or attributes of the above the above described embodiments and variations can be used in combination with any of the other features and attributes of the above described embodiments and variations as desired.

It is apparent from the above detailed description of preferred embodiments of the present invention, that the present invention encourages rapid payoff of overdrafts and/or insufficient funds, and provides a sense of fairness to customers.

From the foregoing disclosure and detailed description of certain preferred embodiments, it is also apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A computer-implemented method for managing financial accounts, the method comprising the steps of:
   (a) receiving an ACH transaction from a presenter for deducting a monetary amount from a financial account of a customer;
   (b) during batch processing on a first day, determining by a financial management system, that there is non-sufficient funds in the financial account for the ACH transaction and flagging the ACH transaction for return to the presenter due to non-sufficient funds but suspending return of the ACH transaction to the presenter;
   (c) automatically transmitting, to at least one electronic device of the customer and by the financial management system, one or more electronic notifications indicating the non-sufficient funds of the financial account for the ACH transaction, the one or more electronic notifications being transmitted during a predetermined period of time;
(d) during batch processing on a second day which is after the first day, determining by the financial management system whether the financial account has sufficient funds for the ACH transaction, and either (i) responsive to there being non-sufficient funds in the financial account for the ACH transaction, automatically assessing a fee, to the financial account and by the financial management system, if the fee was not previously assessed to the financial account, or (ii) responsive to there being sufficient funds in the financial account for the ACH transaction, either waiving the fee, or rebating the fee, to the financial account and by the financial management system, if the fee was previously assessed to the financial account; and
(e) either (i) responsive to there being non-sufficient funds in the financial account for the ACH transaction at batch processing on the second day, returning the ACH transaction to the presenter or (ii) responsive to there being sufficient funds in the financial account for the ACH transaction at batch processing on the second day, deducting the monetary amount of the ACH transaction from the financial account.

2. The computer-implemented method of claim 1, wherein the second day is the next business day after the first day.

3. The computer-implemented method of claim 1, wherein the customer has at least 12 hours from the determination that there is non-sufficient funds for the ACH transaction during batch processing on the first day to deposit sufficient funds to the financial account for the ACH transaction.

4. The computer-implemented method of claim 1, wherein there is at least 24 hours between the batch processing on the first day and the batch processing on the second day.

5. The computer-implemented method of claim 1, wherein the ACH transaction is one of a check transaction or a non-check transaction requiring ACH processing.

6. The computer-implemented method of claim 1, wherein the financial account is a deposit account.

7. The computer implemented method of claim 6, wherein the financial account is any one of a checking account, a savings account, and a money market account.

8. The computer-implemented method of claim 1, wherein at least one of the one or more electronic notifications indicates at least one of an amount by which the financial account has non-sufficient funds, a deadline for depositing funds to avoid the fee being assessed to the financial account, or an amount of the fee.

9. The computer-implemented method of claim 1, wherein each of the one or more electronic notifications are selected from the group consisting of an electronic mail message, an electronic text message, an electronic voice message, and electronic notification within an online banking site or mobile app.

10. The computer-implemented method of claim 1, wherein at least one of the one or more electronic notifications indicates that the fee for returning the ACH transaction can be avoided.

11. A financial accounts management system comprising:
at least one processor;
a network interface in signal communication with at least one electronic device associated with a customer;
memory storing instructions that, when executed by the at least one processor of the financial management system, cause the financial management system to:
(a) receive an ACH transaction from a presenter for deducting a monetary amount from a financial account of a customer;
(b) during batch processing on a first day, determine by a financial management system, that there is non-sufficient funds in the financial account for the ACH transaction and flag the ACH transaction for return to the presenter due to non-sufficient funds but suspend return of the ACH transaction to the presenter;
(c) automatically transmit to the at least one electronic device of the customer and by the financial management system, one or more electronic notifications indicating the non-sufficient funds of the financial account for the ACH transaction, the one or more electronic notifications being transmitted during a predetermined period of time;
(d) during batch processing on a second day which is after the first day, determine by the financial management system whether the financial account has sufficient funds for the ACH transaction, and either (i) responsive to there being non-sufficient funds in the financial account for the ACH transaction, automatically assess a fee, to the financial account and by the financial management system, if the fee was not previously assessed to the financial account, or (ii) responsive to there being sufficient funds in the financial account for the ACH transaction, either waive the fee, or rebate the fee, to the financial account and by the financial management system, if the fee was previously assessed to the financial account; and
(e) either (i) responsive to there being non-sufficient funds in the financial account for the ACH transaction at batch processing on the second day, return the ACH transaction to the presenter or (ii) responsive to there being sufficient funds in the financial account for the ACH transaction at batch processing on the second day, deduct the monetary amount of the ACH transaction from the financial account.

12. The financial accounts management system of claim 11, wherein the second day is the next business day after the first day.

13. The financial accounts management system of claim 11, wherein the customer has at least 12 hours from the determination that there is non-sufficient funds for the ACH transaction during batch processing on the first day to deposit sufficient funds to the financial account for the ACH transaction.

14. The financial accounts management system of claim 11, wherein there is at least 24 hours between the batch processing on the first day and the batch processing on the second day.

15. The financial accounts management system of claim 11, wherein the ACH transaction is one of a check transaction, or a non-check ACH transaction requiring ACH processing.

16. The financial accounts management system of claim 10, wherein the financial account is a deposit account.

17. The financial accounts management system of claim 16, wherein the financial account is any one of a checking account, a savings account, and a money market account.

18. The financial accounts management system of claim 11, wherein at least one of the one or more electronic notifications indicates at least one of an amount by which the financial account has non-sufficient funds, a deadline for depositing funds to avoid the fee being assessed to the financial account, or an amount of the fee.

19. The financial accounts management system of claim 11, wherein each of the one or more electronic notifications are selected from the group consisting of an electronic mail message, an electronic text message, an electronic voice message and electronic notification within an online banking site or mobile app.

20. The financial accounts management system of claim 11, wherein at least one of the one or more electronic notifications indicates that the fee for returning the ACH transaction can be avoided.

\* \* \* \* \*